United States Patent
Bethea

(10) Patent No.: US 7,218,859 B2
(45) Date of Patent: May 15, 2007

(54) SYSTEM AND METHOD FOR AN OPTICAL SIGNAL MONITOR

(75) Inventor: Clyde George Bethea, Franklin Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 606 days.

(21) Appl. No.: 10/412,501

(22) Filed: Apr. 11, 2003

(65) Prior Publication Data
US 2004/0202471 A1  Oct. 14, 2004

(51) Int. Cl.
H04J 14/08 (2006.01)
H04J 14/00 (2006.01)
H04B 10/00 (2006.01)
H04B 10/08 (2006.01)

(52) U.S. Cl. .................. 398/102; 398/161; 398/53; 398/33; 398/34

(58) Field of Classification Search ............... 398/102, 398/161, 33, 34, 99, 53, 31, 30, 52, 32, 47, 398/19, 24
See application file for complete search history.

(56) References Cited

U.S. PATENT DOCUMENTS

| | | | |
|---|---|---|---|
| 5,555,119 A * | 9/1996 | Lewis | 398/161 |
| 6,317,231 B1 | 11/2001 | Al-Salameh et al. | |
| 6,662,001 B1 * | 12/2003 | Roth | 455/314 |
| 6,766,115 B1 * | 7/2004 | Sorin et al. | 398/161 |
| 6,775,478 B2 * | 8/2004 | Suzuki et al. | 398/75 |
| 2003/0175029 A1 * | 9/2003 | Harney et al. | 398/83 |

* cited by examiner

Primary Examiner—Jason Chan
Assistant Examiner—Quan-Zhen Wang

(57) ABSTRACT

Techniques and systems for monitoring of optical signals are described. Each of a plurality of optical signals is supplied to an optical port. A port signal is generated based on each of the optical signals and each of the port signals is subjected to a time delay to create a time delayed signal, with a different time delay being present in each of the time delayed signals. The time delayed signals are multiplexed to create a multiplexed signal comprising a plurality of multiplexed signal components, each component corresponding to one of the time delayed signals and exhibiting a time delay characterizing the corresponding time delayed signal. A desired one or ones of the multiplexed signal components are selected by analysis or display by specifying a time delay present in the time delayed signal represented by the desired component, and selecting a signal component exhibiting the specified time delay.

16 Claims, 9 Drawing Sheets

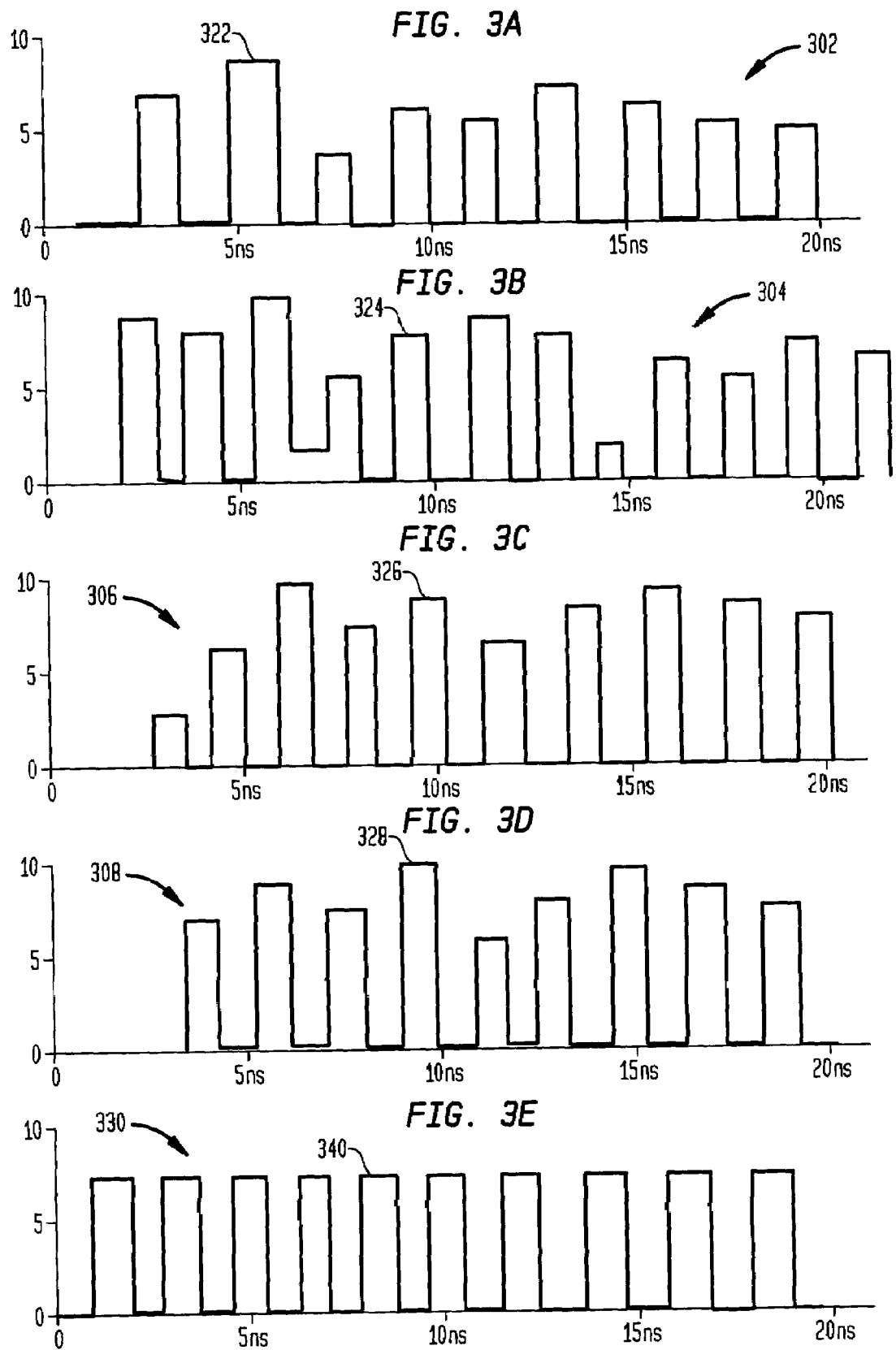

ved signal monitors, and more specifically to advantageous systems and methods for the monitoring of optical transmission channels utilizing optical-electronic techniques.

SYSTEM AND METHOD FOR AN OPTICAL SIGNAL MONITOR

FIELD OF THE INVENTION

The present invention relates generally to optical signal monitors, and more specifically to advantageous systems and methods for the monitoring of optical transmission channels utilizing optical-electronic techniques.

BACKGROUND OF THE INVENTION

Optical transmission systems, and in particular those optical systems employing dense wavelength division multiplexing (DWDM), are desirable because these systems provide extremely wide bandwidths for communications channels. Each optical fiber employed in a DWDM transmission system may typically carry a plurality of 16, 40, 80, or more optical channels, or wavelengths, on the optical fiber. An optical fiber may carry signals originating at a transmitter and passed along a transmission line to a receiver. The transmission line may be very long and may include a plurality of relay stations to boost the signal in order to maintain signal strength. At various points along the transmission line, such as at the transmitter, after one or more relay stations and immediately before the receiver, it is important to monitor and measure various characteristics of the optical signals being transmitted.

A transmission line may comprise a number of optical fibers bundled together into an optical cable. Typical prior art techniques are directed toward monitoring the signals carried by each fiber within a cable, and include the use of mechanical switches or relays to perform physical connection and disconnection of each fiber from a monitoring system. For example, it may be desired to monitor the signals carried by a cable immediately after a relay station. A tap may be placed onto the optical cable, supplying the signal carried by each fiber of the cable to a port of a monitoring system. A mechanical or electromechanical switching system within the monitoring system, for example a system of relays or a rotating mirror, creates and breaks optical connections between each port and analysis circuitry within the monitoring system. When it is desired to monitor the signals being carried by a particular fiber, a connection is established between the port connected to that fiber and the analysis circuitry.

The use of mechanical relays or other mechanical devices to establish and break connections in order to perform analysis suffers from several disadvantages. Mechanical and electromechanical relays are relatively expensive and are much slower and less reliable than purely optical techniques would be.

Accordingly, it would be highly advantageous to provide a more reliable and faster technique for monitoring optical signals than can be achieved through the use of mechanical or electromechanical devices to select between fibers comprising an optical cable.

SUMMARY OF THE INVENTION

A monitoring system according to an aspect of the present invention provides a plurality of ports, with each port receiving a signal from a different fiber. Each fiber may suitably comprise a portion of an optical transmission cable and may carry a plurality of channels. Each port suitably receives an optical signal carried by the fiber and creates an optical port signal, by simply passing along the signal received from the fiber with which it is connected. Alternatively, the port signal may be a modulated port signal, created by modulating the signal received at the port onto a carrier signal provided by, for example, a radio frequency (RF) oscillator or a phase locked loop system.

The port signals are provided to a delay module, which imposes a time delay on each of the port signals to create a delayed port signal. Each port signal is subjected to a different time delay, and therefore the time delay exhibited by each of the delayed port signals is different. The various time delays are known and constant, and are preferably produced by passing each port signal through a length of optical fiber, with the length calculated to produce the desired delay. Because the speed of light is known and constant for a particular wavelength of light, passing an optical signal of a known wavelength through a known length of fiber will impose a known time delay on that signal.

The delayed port signals are provided to a multiplexer, which combines the delayed port signals to produce a multiplexed output. The multiplexed output includes a plurality of signal components, with each signal component representing a corresponding delayed port signal and exhibiting the time delay exhibited by the delayed port signal.

The multiplexed output is supplied to an analysis module within the monitor. Because each of the delayed port signals exhibits a known delay, the corresponding component of the multiplexed output similarly exhibits a known delay. The presence of the different unique delays in the components of the multiplexed signal correspondence of these delays to a known delay imposed on each of the port signals makes it possible to distinguish between the signal components representing the various port signals and to select a desired signal component for analysis by selecting a signal component exhibiting a specified delay corresponding to a particular port. It is therefore possible to select and analyze signals from different fibers simply by specifying and looking for a characteristic, that is, the delay, known to be present in a multiplexed signal component representing the signal carried by the fiber. Therefore, it is not necessary to perform mechanical switching to choose one optical signal or another. Instead, components representing all the optical signals are already present and it is necessary only to select one or more of these signal components by specifying the delay known to correspond to a particular optical signal. Once a signal component has been specified, the signal component can be displayed and various characteristics of the signal component can be examined or used as control parameters. For example, the presence of excessive peak or average power in a signal component may be used as an indication to shut down a transmission line.

A more complete understanding of the present invention, as well as further features and advantages, will be apparent from the following Detailed Description and the accompanying drawings.

BRIEF DESCRIPTION OF THE DRAWINGS

FIGS. 3A–3E illustrate a set of signals subjected to delay imposed by elements of an optical signal monitor according to an aspect of the present invention;

DETAILED DESCRIPTION

The present invention will be described more fully hereinafter with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
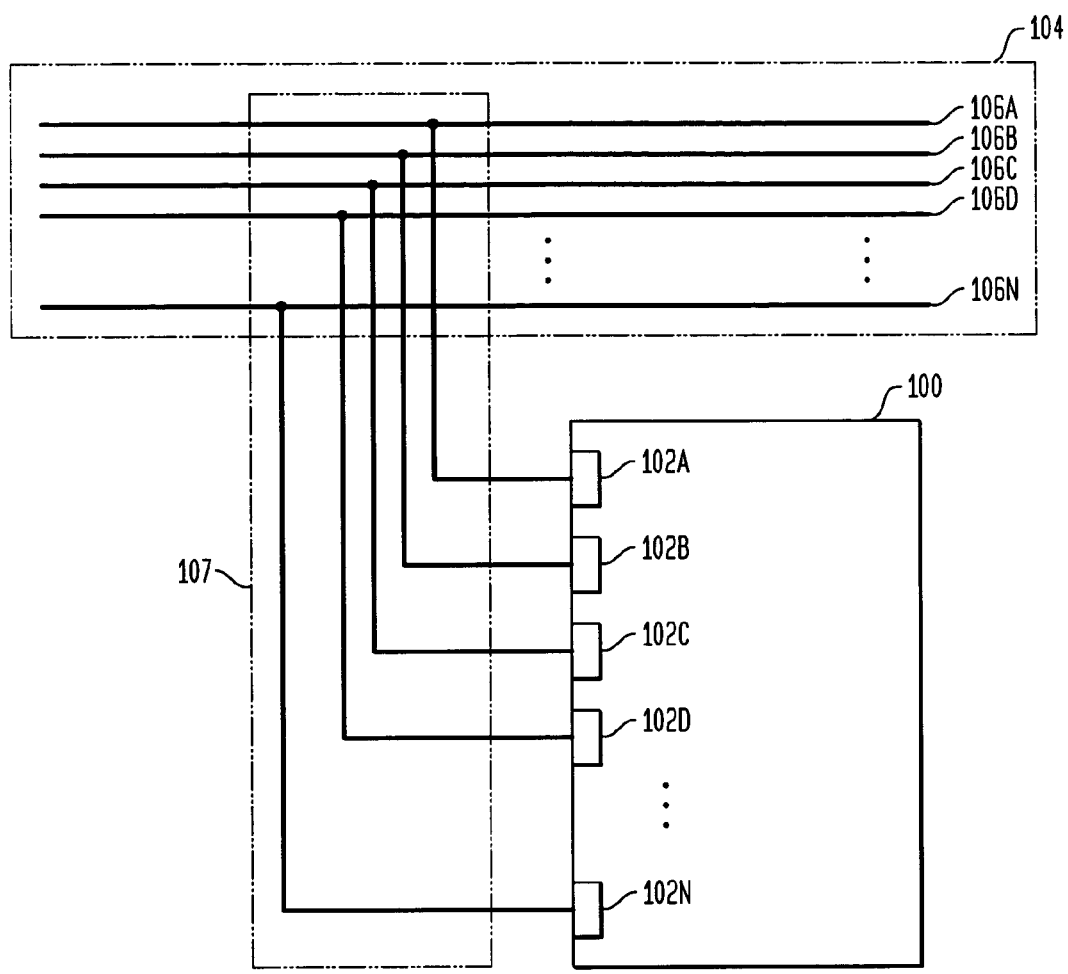
FIG. 1 illustrates an optical signal monitor according to an aspect of the present invention.

FIG. 1 illustrates an optical spectrum monitor 100 according to an aspect of the present invention. The monitor 100 includes a plurality of optical input ports 102A . . . 102N. The optical spectrum monitor may suitably receive signals from an optical transmission line 104, with the transmission line 104 comprising a plurality of optical fibers 106A . . . 106N. Each of the input ports 102A . . . 102N may suitably receive an optical signal from a corresponding one of the fibers 106A . . . 106N. The monitor 100 may be connected to the transmission line 104 through a tap 107. The tap 107 establishes a connection between each of the fibers 106A . . . 106N and a corresponding one of the ports 102A–102N, but the presence of the tap 107 and the connection of the monitor 100 through the use of the tap 107 does not substantially interfere with the transmission of signals over the transmission line 104.

Figure 2:
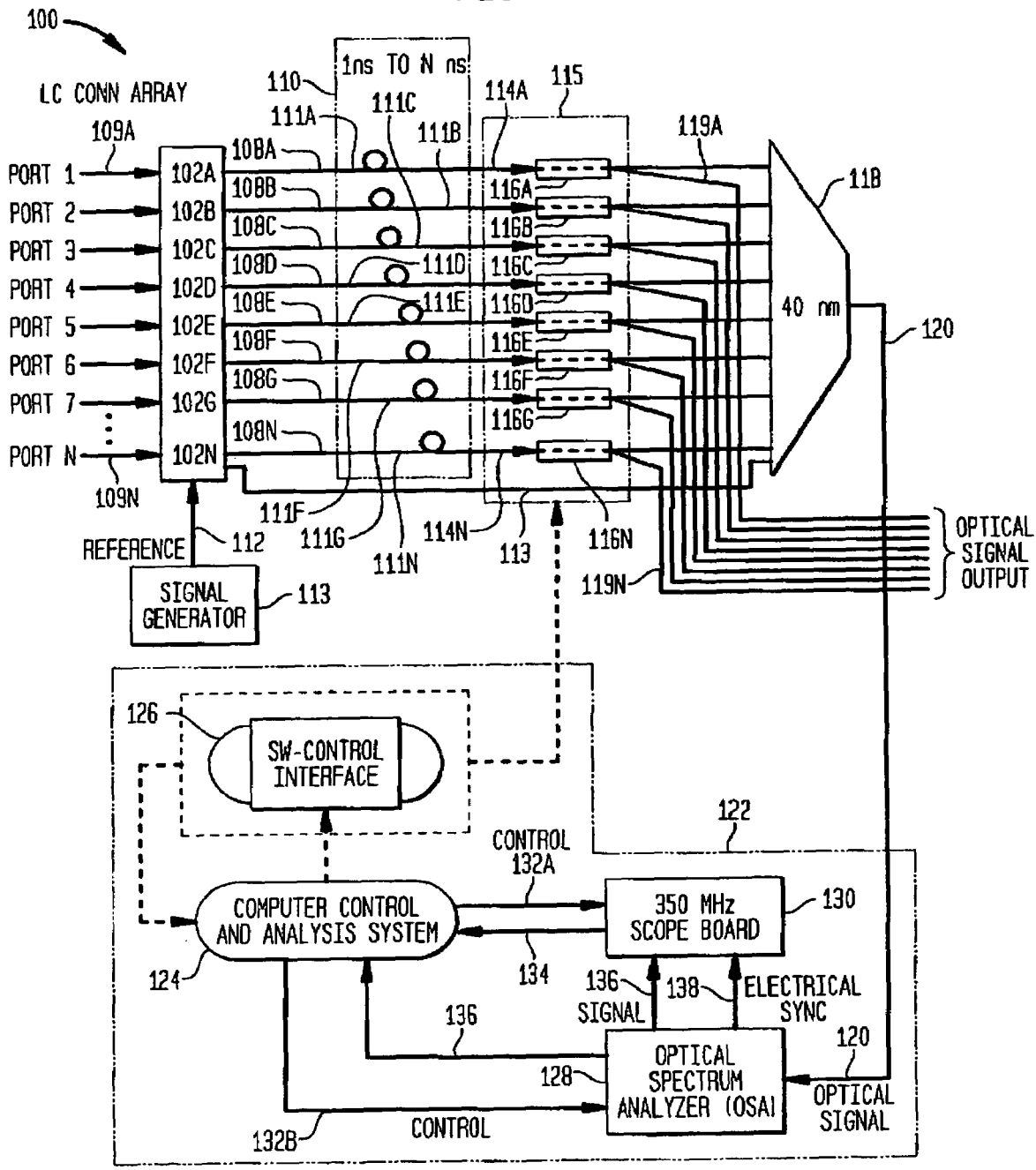
FIG. 2 illustrates additional details of an optical signal monitor according to the present invention.
Figure 4A:
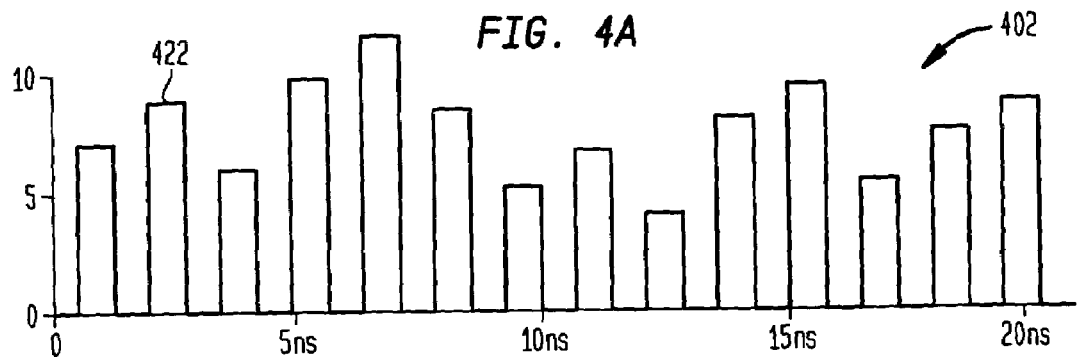
FIGS. 4A–4H illustrate a set of signals subjected to modulation and to delay imposed by elements of an optical signal monitor according to an aspect of the present invention.
Figure 4B:
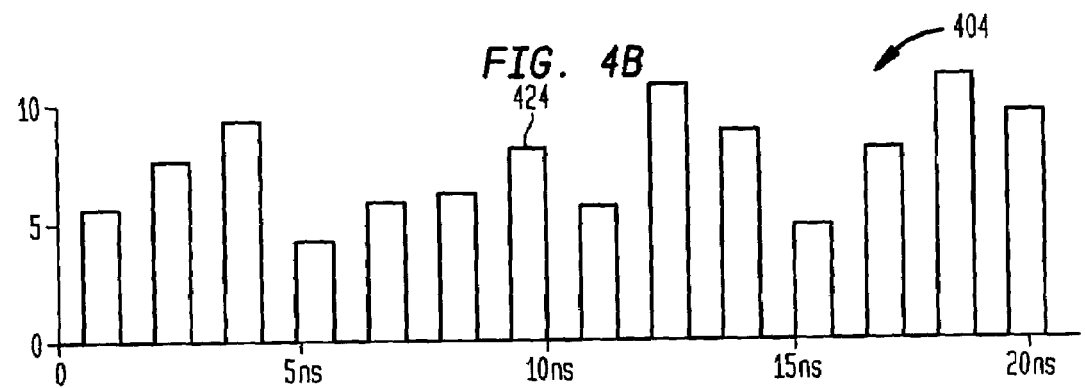
Figure 4C:
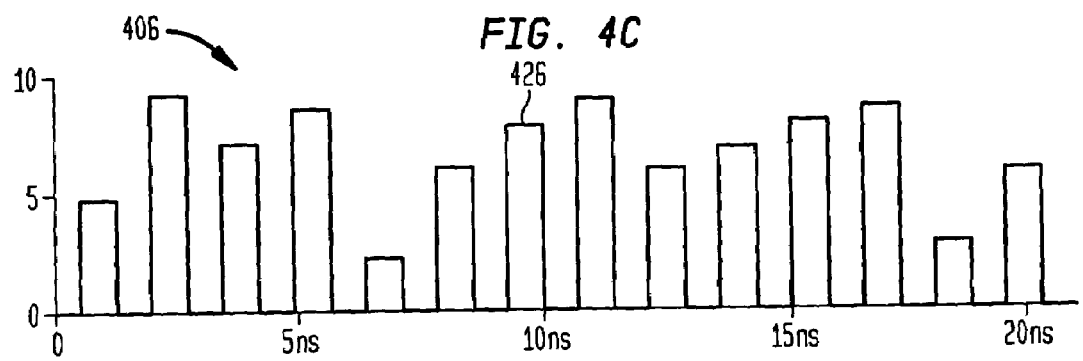
Figure 4D:
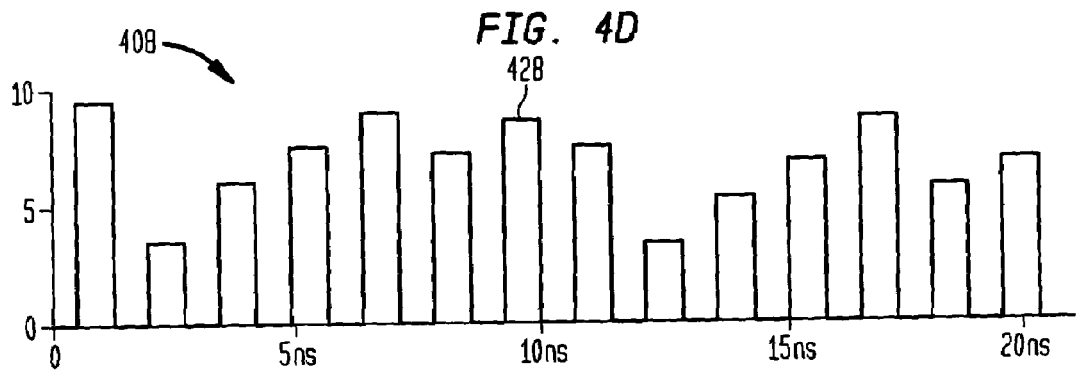
Figure 4E:
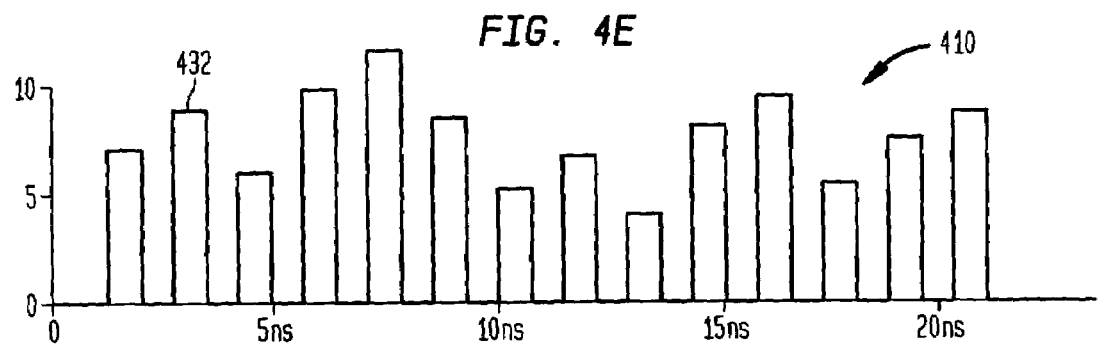
Figure 4F:
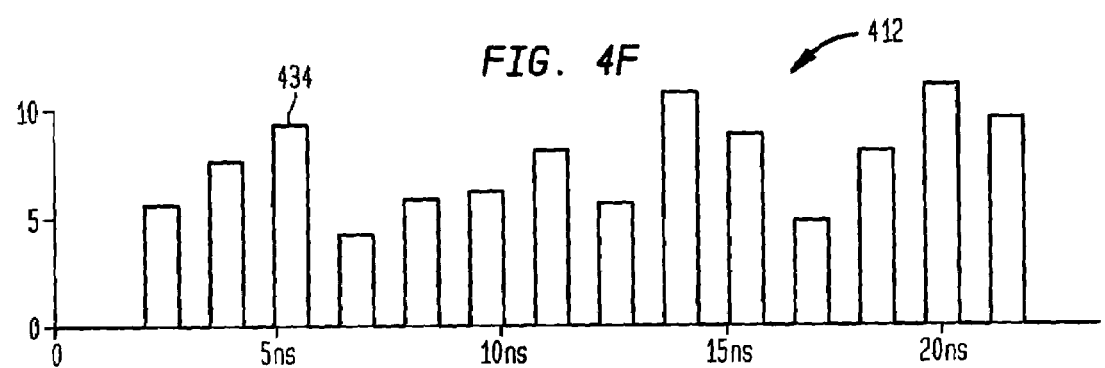
Figure 4G:
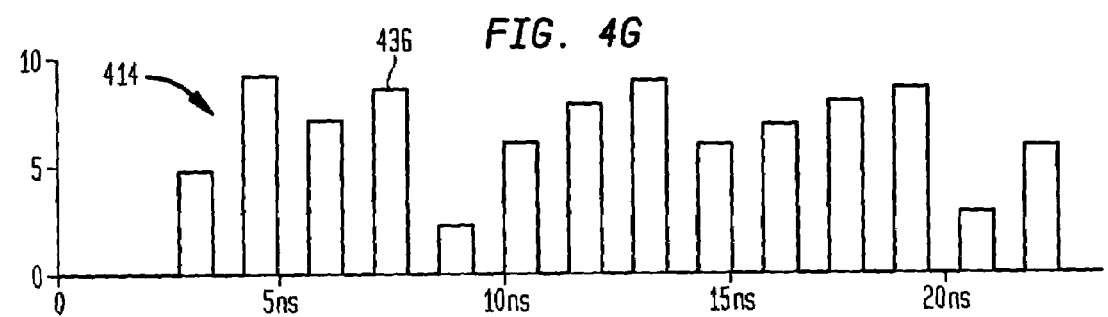
Figure 4H:
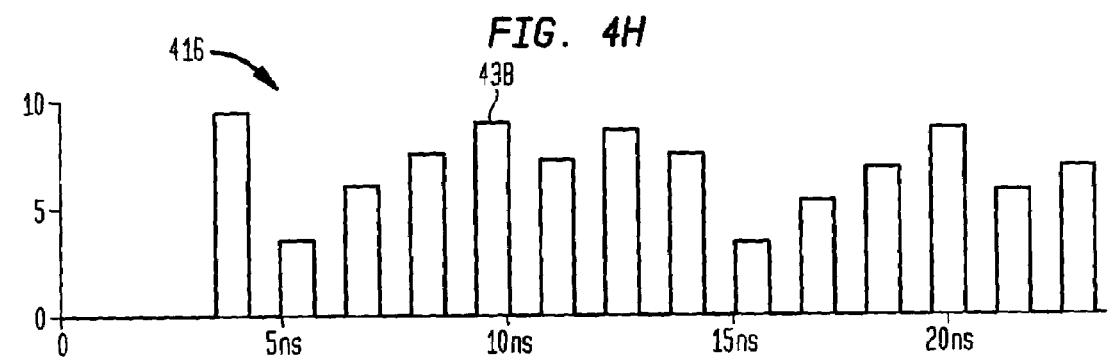

FIG. 2 illustrates additional details of an exemplary embodiment of the monitor 100, showing the ports 102 . . . 102N and internal connections and details of the monitor 100. The input ports 102A . . . 102N generate port signals 108A . . . 108N. In the embodiment illustrated here, the port signals 108A . . . 108N may be generated by simply passing optical inputs 109A . . . 109N received at the input ports 102A . . . 102N. The port signals 108A . . . 108N are provided to a delay module 110. The delay module 110 comprises a plurality of delay elements 111A . . . 111N, with each delay element suitably being an optical fiber having a length chosen to impose a specified delay on an optical signal passing through the delay element. The delay arises from the time required for an optical signal to pass through the length of fiber. Each of the delay elements 111A . . . 111N suitably comprises a different length of fiber, so that each of the delay elements 111A . . . 111N will impose a different delay. In order to provide a reference to identify the delays imposed by the delay elements 111A . . . 111N, a reference signal 112 may suitably be supplied to the port array and passed through the delay module 110. The reference signal 112 may be subjected to a known delay or alternatively be passed unchanged. The reference signal 112 may suitably be produced by a signal generator 113.

The delay module 110 receives the port signals 108A . . . 108N and produces delayed port signals 114A . . . 114N. Each of the delayed port signals 114A . . . 114N corresponds to one of the port signals 108A . . . 108N, but is delayed in time due to the delay imposed by a corresponding one of the delay elements 111A . . . 111N.

The monitor 100 may suitably include a switch array 115, comprising switches 116A . . . 116N. The switches 116A . . . 116N may suitably be liquid crystal switches. The delayed port signals 114A . . . 114N are provided as inputs to a multiplexer 118, which may suitably be a wave division multiplexer. The switches 116A . . . 116N may be used to control whether one of the delayed port signals 114A . . . 114N is to be provided to or isolated from the multiplexer 118. The monitor 100 may optionally include a plurality of optical outputs 119A . . . 119N, and the switches 116A . . . 116N may be used to switch each of the delayed port signals 114A . . . 114N between the multiplexer 118 and a corresponding one of the optical outputs 119A . . . 119N. When one of the delayed port signals 114A . . . 114N is switched to an optical output, that delayed port signal is isolated from the multiplexer 118 and does not provide an input to the multiplexer 118.

The multiplexer 118 produces a multiplexer output signal 120. The multiplexer output signal 120 comprises a plurality of components, each component corresponding to and representing one of the delayed port signals 114A . . . 114N. The multiplexer output 120 signal is provided to an analysis module 122.

The analysis module 122 is capable of examining the multiplexer output signal 120, isolating the individual components of the signal 120 and selecting a component for examination, display or use as a command or parameter by noting the time delay exhibited by the component. Each of the components of the multiplexer signal 120 has a characteristic time delay as a result of the delay exhibited by the delayed port signals 114A . . . 114N. The delay arises, as noted above, from delay imposed on the port signals 108A–108H by the delay module 110.

The analysis module 122 is preferably preprogrammed to recognize the amount of delay imposed on each of the port signals 108A. . .108N by the delay module 110. Each of the ports 102A. . .102N is associated with a specified delay, and this delay will be exhibited by the delayed port signals 114A. . .114N, and by the corresponding components of the multiplexed signal 120. The delay may be identified by comparing the components of the multiplexed signal representing delayed port signals 114A. . .114N to the component representing the reference signal 112.

When it is desired to examine a particular one of the delayed port signals 114A . . . 114N, the analysis module 122 examines the multiplexer output signal 120 to identify the signal component exhibiting the delay associated with the signal of interest. For example, the signal component representing the delayed port signal 114A, and therefore the port signal 108A, may suitably exhibit a delay of 1 nanosecond, the signal component representing the delayed port signal 114B, and therefore the port signal 108B, may represent a delay of 2 nanoseconds, and so on. The analysis module 122 may suitably be programmed to recognize a signal component having a delay of one nanosecond as representing the port signal 108A, to recognize a signal component having a delay of two nanoseconds as representing the port signal 108B, and so on. By recognizing that the delay exhibited by a signal component corresponds to a predetermined, known delay, the analysis module 122 can easily identify a signal originating at a particular port when it is desired to display, analyze or respond to that signal.

When it is desired to analyze one or more of the port signals 108A . . . 108N, the analysis module 122 selects a port signal to be analyzed and identifies the delay associated with the selected port signal. The selection and determination of the associated delay may suitably be performed by a computer control and analysis system 124, which may employ stored information such as lookup tables to associate delay values with signals to be identified. The computer control and analysis system 124 may employ a software control interface 126. The software control interface 126 may suitably include instructions for signal selection and analysis or instructions directing responses to operator commands. For example, the software control interface may include instructions specifying the sequence in which signals are to be examined, the frequency with which signals are to be examined or specific characteristics of signals which are to trigger particular responses. For example, the software control interface may include instructions directing a shutdown of a transmission line if a specified signal shows excessive power.

Once a signal has been selected and the delay associated with that signal has been identified, the computer control and analysis system 124 directs one or both of an optical spectrum analyzer 128 and an oscilloscope module 130 to select the desired component of the multiplexer signal 120. The computer control and analysis system 124 furnishes control signals 132A and 132B to the spectrum analyzer 128 and the oscilloscope module 130, respectively. The oscilloscope module 130 furnishes an electrical signal 134 to the computer control and analysis system 124 and the spectrum analyzer 128 furnishes an optical signal 136 to each of the computer control and analysis system 124 and the oscilloscope module 130 as well as an electrical sync signal 138 to the oscilloscope module 130.

The desired component is the component of the multiplexer signal 120 exhibiting the delay associated with the signal to be analyzed. For example, suppose it is desired to analyze the port signal 108D and the port signal 108D is subjected to a 4 ns delay by the delay module 110, causing the delayed port signal 114D to exhibit a delay of 4 ns. The computer control and analysis system 124 determines, for example by consulting a lookup table, that the port signal 108D is subjected to the 4 ns delay. The computer control and analysis system 124 then directs the spectrum analyzer 128 to examine the multiplexer signal 120 and to select the component of the multiplexer signal 120 exhibiting a delay of 4 ns. This component represents the delayed port signal 114D, which in turn represents the port signal 108D. In addition, the oscilloscope module 130 may suitably generate a graphic display of one or more signal components, or may provide desired information, such as amplitude, frequency and timing information to the computer control and analysis system 124. The optical spectrum analyzer 128 provides desired information about the selected signal component to the computer control and analysis system 124. The computer control and analysis system 124 can direct the display of the selected signal or selected features and characteristics of the signal, or can make calculations or direct the performance of actions based on the characteristics of the signal. For example, if the selected signal shows that excessive power is being transmitted, the computer control and analysis system 124 can direct a shutdown of a transmitting station producing the signal. Selection of a signal for examination can be achieved simply by mathematical computations relating to the delay characteristics of the signal and can be performed as fast as allowed by the computational speed of the computer control and analysis system 124 and the optical spectrum analyzer 128. All information present in the delayed port signals 114A . . . 114N is present in the multiplexer output signal 120, so that the analysis module 122 has continuous access to this information. Instead of directing a mechanical operation to allow access to a particular signal source, the analysis module 122 performs computations and selections in order to focus attention and analysis on specific components of a signal.

The analysis module 122 is able to determine that the signals 114A–114H exhibit delay by comparing them with the reference 112. In addition to a separate reference signal 113 shown in the presently illustrated embodiment, it is also possible to provide a reference in the form of a carrier signal used to modulate optical inputs. As will be discussed in greater detail below, each of a plurality of optical input signals such as the signals 109A. . .109N may be used to modulate a carrier signal. Each of the modulated carrier signals may then be subjected to a delay, in order to produce delayed port signals in the form of modulated carrier signals. The carrier signals have similar characteristics, so that relative delays of carrier signals with respect to other carrier signals can be recognized. The relative delays can be identified and used to distinguish the different signals.

FIGS. 3A–3E illustrate the effect of a delay module such as the delay module 110 of FIG. 1. FIGS. 3A–3D are graphs 302–308, respectively, showing signals 322–328, plotted against time. Each of the signals 322–328 exhibits a delay, imposed by passing an originating signal through a delay element such as a port of the delay module 110 of FIG. 1. The delay exhibited by each of the signals 322–328 is different from that exhibited by each of the other signals 322–328, and is predetermined, suitably by passing each signal through a known length of optical line.

FIG. 3E is a graph 330, showing a reference signal 340. The reference signal 340 may be an optical or electrical signal and is subject to a known delay, which may be a zero delay. The reference signal 340 preferably has distinctive features to allow comparison with the signals 322–328. An analysis module such as the analysis module 122, upon receiving the reference signal 340 and either the signals 322–328 or a combined or multiplexed signal having representations of the signals 322–328 as components, can identify the delay characterizing each of the signals 322–328 and can use the delay to identify each signal.

FIGS. 4A–4H illustrate a set of graphs 402–416, respectively, showing the effects of delay on a plurality of modulated signals. The graphs 402–408 illustrate a plurality of modulated signals 422–428 and the graphs 410–416 illustrate delayed modulated signals 432–438. Each of the delayed modulated signals 432–438 results from the imposition of a time delay on a corresponding one of the modulated signals 422–428.

Each of the modulated signals 422–428 is plotted against time and shows the effect of modulating a signal, such as an optical data signal, onto a carrier. It can be seen that each of the modulated signals 422–428 exhibits similar characteristics as a result of the carrier, with differences arising from the modulation of the carrier by data signals.

The graphs 402–408 show the modulated signals 422–428, while the graphs 410–416 show delayed modulated signals 432–438. The delayed modulated signals 432–438 result from the imposition of a delay on each of the modulated signals 422–428, respectively. It can be seen that the delayed modulated signals 432–438 have similar characteristics due to the presence in each of the carrier signal.

However, the delayed modulated signals 432–438 are shifted in time by varying degrees due to the time delay imposed on the modulated signals 422–428 in order to create the delayed modulated signals 432–438. The similarity of the delayed modulated signals 432–438 makes it possible to select one of the signals 432–438 for use as a reference and to recognize the delay exhibited by each of the signals 432–438 by comparing each signal against the signal chosen as a reference. If each originating source of a signal is associated with a specific delay value, knowledge of the delay exhibited by each of the signals 422–428 can be used to identify the originating source of the signal.

Figure 5:
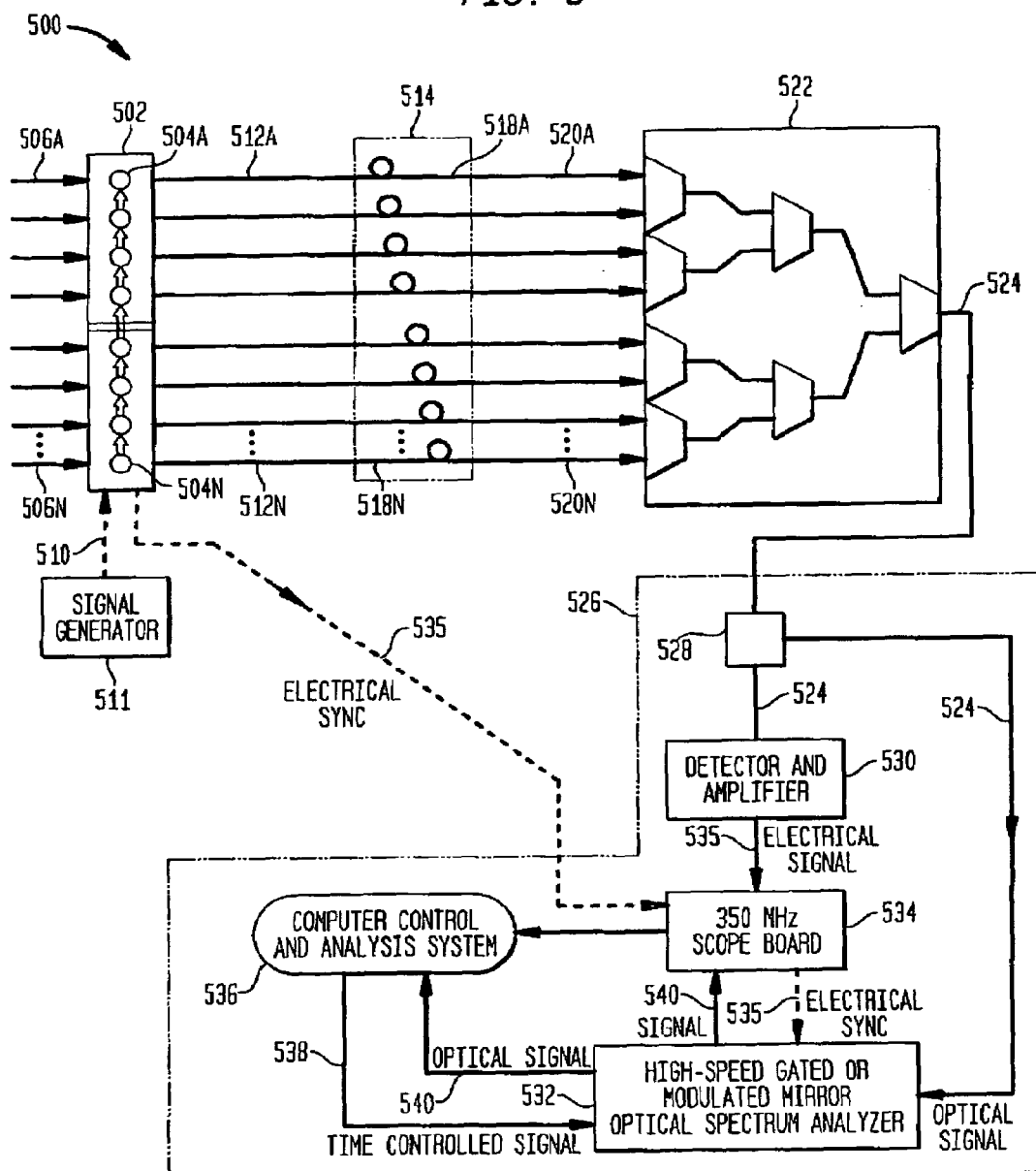
FIG. 5 illustrates an optical signal monitor according to an alternative aspect of the present invention.

FIG. 5 illustrates an optical spectrum monitor 500 according to an alternative embodiment of the present invention. The spectrum monitor 500 includes a port array 502 including ports 504A . . . 504N. Each of the ports 504A . . . 504N receives a corresponding one of the port signals 506A . . . 506N, respectively. The port array 502 may suitably be an acousto-optic transducer modulator array, with each of the ports 504A . . . 504N being an acousto-optic transducer capable of receiving the port signals 506A . . . 506N, respectively, and modulating the port signal with a reference signal 510. In the exemplary embodiment illustrated here, each of the ports 504A . . . 504N operates utilizing an acousto-optic effect in which the port signal passes through a glass material in which traveling acoustic waves are also present. The traveling acoustic waves are generated by the reference signal 510. As would be understood by one skilled in the art, density variations in the glass corresponding to compressions and rarefactions of the traveling acoustic waves are accompanied by corresponding changes in the index of refraction for light provided by the glass. These changes in the index of refraction alter the transmission of the port signals through the glass, so that the output of each of the ports 504A . . . 504N represents a corresponding one of the port signals 506A . . . 506N, as the signal modulates the reference signal 510. The reference signal 510 may suitably be an output signal of a signal generator 511. The signal generator 511 may suitably be an RF oscillator. Alternatively, the signal generator 511 may be a phase locked loop (PLL).

As discussed above, the port array 502 modulates the reference signal 510 with each of the port signals 506A . . . 506N, to produce modulated port signals 512A . . . 512N. Each of the modulated port signals 512A . . . 512N comprises a corresponding one of the port signals 506A . . . 506N, superimposed onto the reference signal 510, which acts as a carrier. The modulated port signals 512A . . . 512N are supplied to a delay module 514. The delay module 513 suitably comprises a plurality of delay elements 518A . . . 518N. Each of the delay elements 518A . . . 518N preferably comprises a length of optical fiber chosen so that an optical signal takes a specified time to pass through it. The time that an optical signal takes to pass through a delay element comprising an optical fiber depends on the length of the optical fiber comprising the delay element and the speed of light at the wavelength chosen for the optical signal.

The delay module 514 produces a plurality of delayed modulated port signals 520A . . . 520N, respectively. Each of the delayed port signals 520A . . . 520N comprises a corresponding one of the modulated port signals 512A . . . 512N, subjected to a delay. Thus, the signal 520A may comprise the signal 512A, subjected to a 1 ns delay, the signal 520B may comprise the signal 512B, subjected to a 2 ns delay, and so on. Each of the delayed modulated port signals 520A . . . 520N, therefore, comprises an associated one of the port signals 506A . . . 506N, modulated onto the reference signal 510, and subjected to a delay.

Each of the delayed port signals is provided as an input to a WDM multiplexer 522, which produces a multiplexed signal 524. The multiplexed signal 524 includes a plurality of components, each component representing one of the delayed modulated port signals 520A . . . 520N. The multiplexed signal 524 may suitably be provided to an analysis module 526, which may be similar in many respects to the analysis module 122 of FIGS. 1 and 2.

The analysis module 526 includes a beam splitter 528, which splits the multiplexed signal 524 into two paths. One path leads to a detector and amplifier module 530, which generates an electrical signal 532 based on the multiplexed signal 524. Because the inputs to the multiplexer 522 are modulated using the reference signal 510, it is not necessary to provide a separate reference signal to the analysis module 526. Instead, the analysis module 526 is able to use the reference signal 510, which appears in each component of the multiplexed signal 524, as a reference against which to measure delays. The reference signal 510 is detectable in each component of the multiplexed signal 524. Each component of the multiplexed signal 524 can be distinguished from the others because the delay to which the reference signal 510 has been subjected is different for each of the delayed port signals 520A . . . 520H and therefore for each component of the multiplexed signal 524. For example, characteristics of the reference signal 510 will appear in the delayed port signals 520A and 520B, but specific characteristics of the reference signal 510 appearing in the delayed port signal 520B will be delayed with respect to corresponding characteristics appearing in the delayed port signal 520A. The analysis module 526 is able to use, for example, the delayed port signal 520A as a reference and to identify and isolate the remaining port signals by noting their delay with respect to the delayed port signal 520A. Each of the delayed port signals 520A . . . 520N actually appears to the analysis module 526 as a component of the multiplexed signal 520, but the analysis module 526 is able to interpret the multiplexed signal 524 in order to distinguish the components from one another. As noted above with respect to FIG. 2, the analysis module 526 selects a signal for examination, identifies the delay associated with the selected signal and analyzes the component of the multiplexed signal 520 exhibiting the desired degree of delay.

The analysis module 526 includes a beam splitter 528, which directs the multiplexed signal 524 to a detector and amplifier module 530 and to a spectrum analyzer 532. The spectrum analyzer may suitably be a high speed gated or modulated mirror optical spectrum analyzer. The analysis module also includes an oscilloscope module 534, which receives an electrical signal 535 generated by the detector and amplifier module 530. The electrical signal 535 is based on the multiplexed signal 524. The oscilloscope module 534 also receives an electrical sync signal 535 from the port array 502. The sync signal 535 is based on the reference signal 510 produced by the signal generator 511.

The analysis module 526 also includes a computer control and analysis system 536, producing a time controlled signal 538 to direct the operations of the spectrum analyzer 532. The time controlled signal 538 includes commands and selections to direct the operation of the spectrum analyzer 532. For example, the time controlled signal 538 may identify signals of interest and direct the examination of the signals of interest. For example, the time controlled signal 538 may direct the spectrum analyzer to return peak power information relating to the external optical input signal 506A.

The spectrum analyzer 532 returns an optical signal 540 to the interface module computer control and analysis module 536, as well as to the oscilloscope module 534. The optical signal 540 is based on selections and instructions contained in the time controlled signal 538. For example, the spectrum analyzer may specify one or more components of the multiplexer signal 524 for analysis, and may select specified parameters of the specified component based on the multiplexer signal 524 and the directions included in the time controlled signal 538. The components of the multiplexer signal 524 are distinguished by the various delays exhibited by the different components as a result of the delays imposed by the delay module 514. The computer control and analysis system 536 may construct displays, perform analyses and take action based on the characteristics of the selected signal components. In addition, the oscilloscope module 534 may construct displays of selected signals, based on the optical signal 540 provided by the spectrum analyzer 532.

Figure 6:
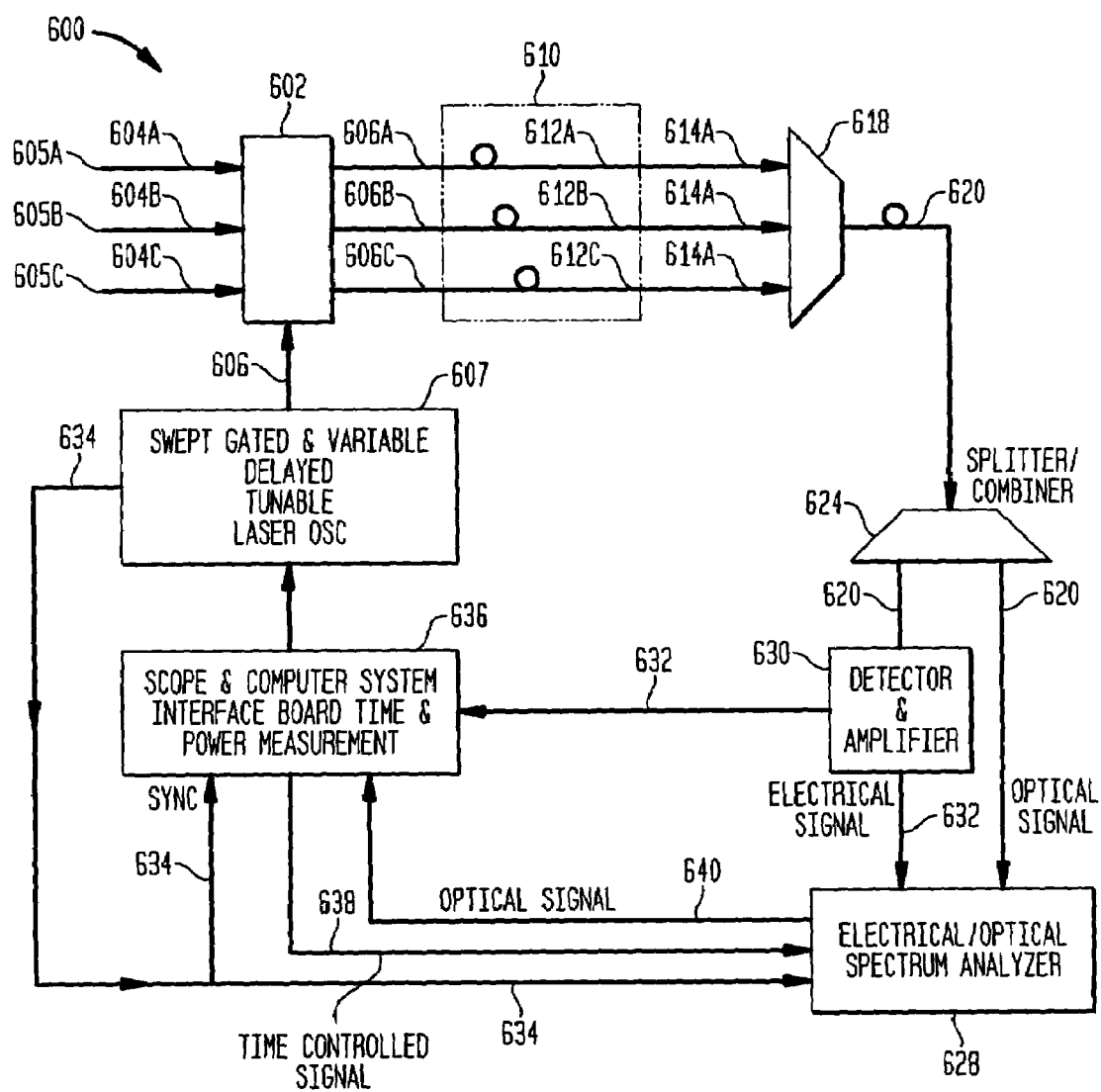
FIG. 6 illustrates an optical signal monitor according to a further alternative aspect of the present invention.

FIG. 6 illustrates a monitor 600 according to an alternative aspect of the present invention. The monitor 600 includes a port module 602, here shown as including ports 604A–604C, receiving external optical input signals 605A–605C, and a reference signal 606, produced by a signal generator 607. The signal generator 607 may suitably be a swept gated and variable delayed tunable laser oscillator. The port module may suitably modulate the optical inputs 605A–605C onto the reference signal 606 to produce port signals 608A–608C. While three ports 604A–604C and three external inputs 605A–605C are illustrated here, it will be recognized that any number of ports may be implemented, and any number of optical inputs accommodated, by making appropriate design choices. The port module 602 produces port signals 608A–608C, which are provided to a delay module 610. The delay module 610 comprises delay elements 612A–612C, each imposing a predetermined delay on a corresponding one of the signals 608A–608C. The delay module 610 produces delayed signals 614A–614C, each of which represents one of the external optical signals 605A–605C, modulated onto the reference signal 610, and subjected to a delay imposed by one of the delay elements 612A–612C.

The delayed signals 614A–614C are provided to a wave division multiplexer 618, which produces a multiplexed signal 620. The multiplexed signal 620 is provided to a splitter 624, which diverts the signal 620 to two separate paths. The multiplexed signal 620 is provided to an electrical/optical spectrum analyzer 628 and a detector and amplifier module 630. The detector and amplifier module produces an electrical signal 632 based on the multiplexed signal 630, and provides the electrical signal 632 to the spectrum analyzer 628. The spectrum analyzer 628 receives a sync signal 634 from the signal generator 607.

The monitor 600 also includes an oscilloscope and computer interface module 636, which acts to control the spectrum analyzer 628 and to analyze signals generated by the spectrum analyzer 628 and the detector and amplifier assembly 630. The interface module 636 receives a sync signal 634 from the signal generator 607, and provides a time controlled signal 638 to the spectrum analyzer 628. The time controlled signal 638 includes commands and selections to direct the operation of the spectrum analyzer 638. For example, the time controlled signal 638 may identify signals of interest and direct the examination of the signals of interest. For example, the time controlled signal 638 may direct the spectrum analyzer to return peak power information relating to the external optical input signal 605A.

The spectrum analyzer 628 returns an optical signal 640 to the interface module 636, based on the multiplexer signal 620 and the directions included in the time controlled signal 638. The interface module may suitably construct displays or take actions based on the optical signal 640. The interface module 636 also receives the electrical signal 634 from the detector and amplifier module 638, and constructs displays and takes action based on the signal 634.

As noted above with respect to FIGS. 2 and 5, the multiplexer signal 620 includes a component representing each of the delayed signals 614A–614C, and the delayed signals 614A–614C provides the information included in the external optical signals 605A–605C, but exhibiting the delay imposed by the delay elements 612A–612C. The components of the multiplexer signal 620 include the information provided by the external optical signals 605A–605C, and the components are distinguishable because of the presence of the different predetermined delays.

Figure 7:
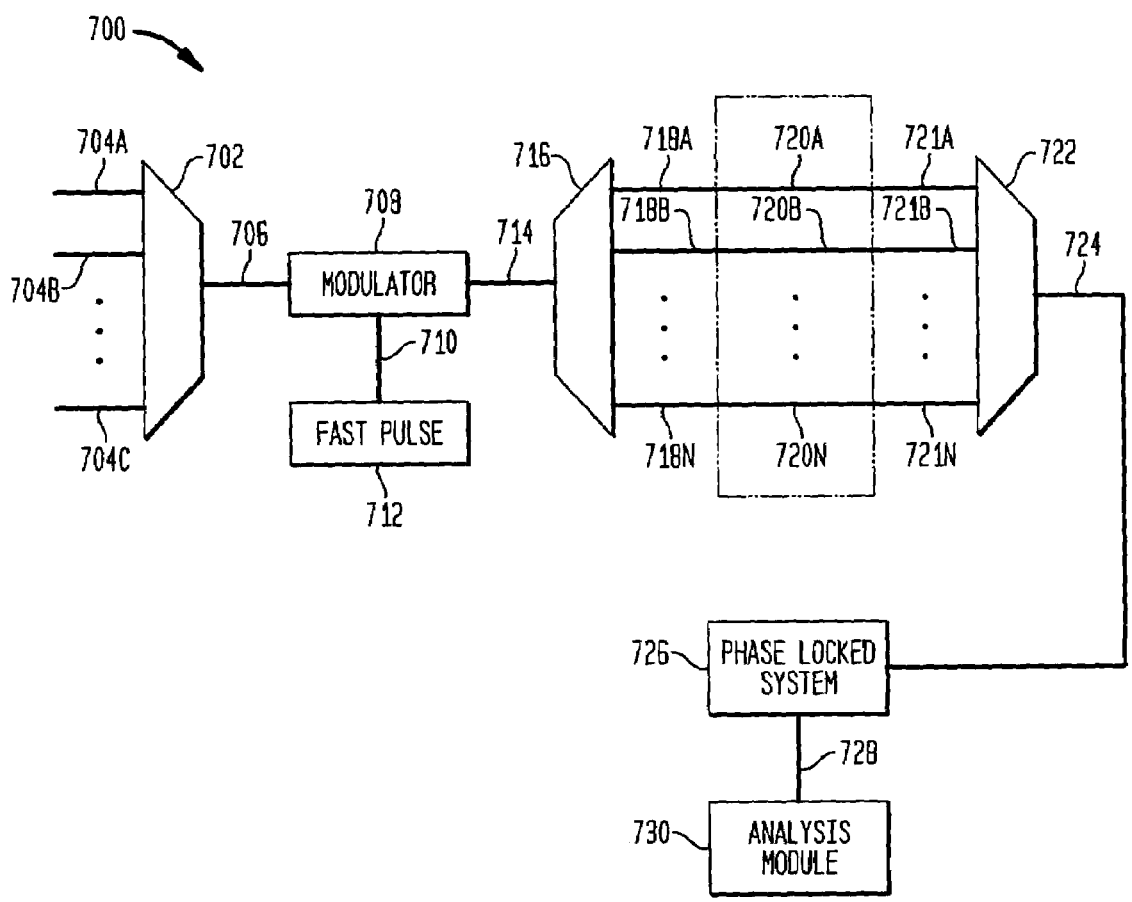
FIG. 7 illustrates an optical signal monitor according to a further alternative aspect of the present invention.

FIG. 7 illustrates an alternative monitor 700 according to an alternative aspect of the present invention. The monitor 700 comprises a port array 702, implemented as a multiplexer. The port array 702 receives external input signals 704A . . . 704N and produces a multiplexed port signal 706. The multiplexed port signal is supplied to a modulator 708, which receives a sync signal 710 from a fast pulse generator 712. The modulator 708 modulates the multiplexed port signal 706 onto the sync signal 710 to produce a modulated multiplexed signal 714. The modulated multiplexed port signal 714 is provided to a demultiplexer 716. The demultiplexer demultiplexes the port signal 714 to recover the signals 704A . . . 704N and provides the signals 704A . . . 704N to a delay module 718. The delay module 718 comprises a plurality of delay elements 720A . . . 720N, each of which imposes a predetermined delay on a corresponding one of the signals 704A . . . 704N to produce delayed signals 721A . . . 721N. The delayed signals 721A . . . 721N are provided to a multiplexer 722, which combines the delayed signals 721A . . . 72lN into a delayed multiplexed signal 724. The delayed multiplexed signal 724 is provided to a phase locked system 726, which locks the delayed multiplexed signal 724 to the sync signal 710, in order to provide a reference, thereby creating a synchronized signal 728. The synchronized signal 728 is then provided to an analysis module 730, which performs analysis in a similar way to that of the analysis module 122 of FIGS. 1 and 2, the analysis module 526 of FIG. 5 and the analysis components of the monitor 600 of FIG. 6.

Figure 8:
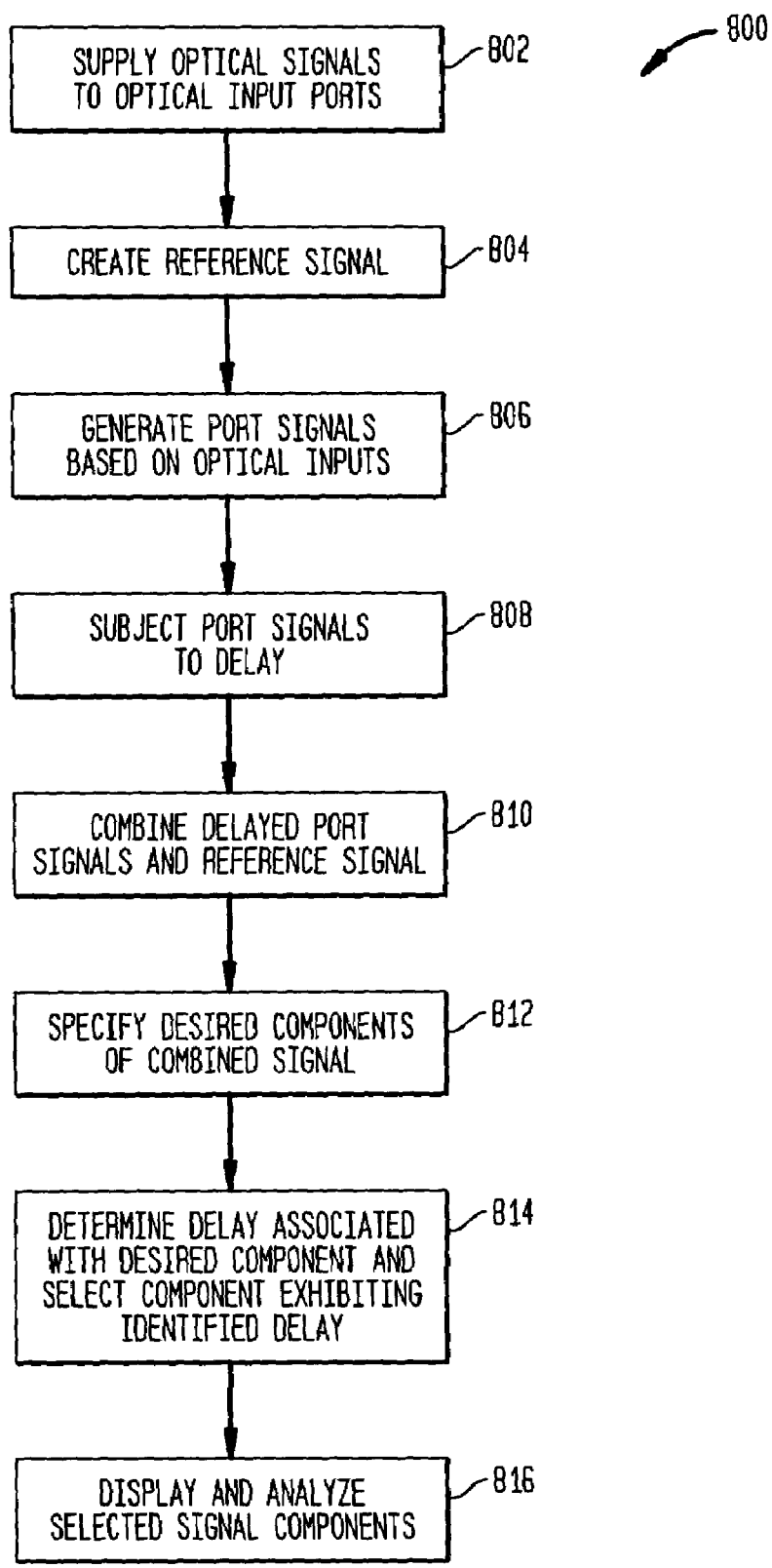
FIG. 8 illustrates a process of optical signal selection and analysis according to an aspect of the present invention.

FIG. 8 illustrates the steps of a method 800 of optical signal analysis according to an aspect of the present invention. At step 802, a plurality of optical inputs are supplied to optical signal ports. Each of the optical signal ports may suitably receive a signal from one optical fiber in an optical transmission line and is suitably connected to the transmission line through a tap. Each fiber may suitably carry a plurality of optical signal channels combined into a single signal, for example by transmitting a plurality of optical wavelengths combined into a single signal. At step 804, a reference signal is created to be used for comparison against the optical signals. The reference signal may suitably be created using a phase locked loop system, an RF generator or another suitable technique. At step 806, port signals are generated based on the optical inputs. The port signals may suitably be generated simply by directly passing the optical inputs, or may alternatively be generated by using the reference signal as a pilot signal and modulating each of the optical signals onto the pilot signal. At step 808, the port signals and the reference signal are subjected to a delay, for example by passing each signal through a fixed length of optical fiber whose length is chosen to create a desired delay, and thereby creating a delayed port signal corresponding to each port signal. If the reference signal has been used to provide a pilot signal for modulation by the optical inputs, the reference signal is present as an underlying pilot signal comprising each of the port signals. If the reference signal has not been used to modulate the port signals, the reference signal is treated separately and subjected to a designated delay which may suitably be a zero delay. At step 810, all of the delayed port signals, as well as the reference signal, either as a component of the port signals or as a separate signal, are combined, suitably using wave division multiplexing. The combined signal includes components representing each of the optical inputs, with each component exhibiting a predetermined delay associated with the optical input. At step 812, desired signal components are specified for analysis and desired parameters and characteristics of the signal components are selected for examination. At step 814, the delay characteristic of each specified signal component is determined and the components of the combined signal that have been specified are identified by examining their characteristic delay. At step 816, displays are constructed showing specified signal components and selected characteristics of the signal components, analyses are made of the specified signal components and actions are taken based on selected characteristics of the signal components.

While the present invention is disclosed in the context of a presently preferred embodiment, it will be recognized that a wide variety of implementations may be employed by persons of ordinary skill in the art consistent with the above discussion and the claims which follow below.

I claim:

1. An optical monitor for monitoring a plurality of optical signals transmitted over an optical transmission line comprising a plurality of optical fibers, the optical monitor comprising:
 a plurality of optical ports, each port receiving an optical signal from one of the plurality of optical fibers, each port generating a port signal based on its corresponding optical signal;
 a delay module for imposing different time delays on each of the port signals to create a plurality of time delayed signals;
 a multiplexer for combining the time delayed signals to create a multiplexed signal comprising a plurality of components, each component representing one of the time delayed signals and having a characteristic time delay; and
 an analysis module for receiving the multiplexed signal and selecting a desired signal component for analysis, the analysis module selecting the desired signal component by recognizing its characteristic time delay, the analysis module distinguishing signal components representing signals originating from different sources.

2. The monitor of claim 1, wherein the analysis module is operative to select a desired component of the multiplexed signal for analysis by specifying a time delay associated with the desired component and selecting the component exhibiting the specified time delay.

3. The monitor of claim 2, wherein each of the optical ports is associated with a predetermined time delay imposed on signals entering that port and wherein the analysis module identifies a component of the multiplexed signal with a port by recognizing the presence in the signal component of the time delay associated with that port.

4. The monitor of claim 3, wherein the analysis module includes a computer control and analysis system operative to select a desired component of the multiplexed signal for analysis, the computer control and analysis system being operative to specify a port whose signal is to be analyzed, to identify a time delay associated with the specified port and to select a signal component exhibiting the identified time delay.

5. The monitor of claim 4, wherein the analysis module includes an oscilloscope module for displaying a waveform representing one or more selected signal components and wherein the oscilloscope module is operative to receive from the computer control and analysis module instructions specifying the signal component to be displayed.

6. The monitor of claim 5, wherein the computer control and analysis system is operative to specify a time delay characterizing the signal component to be displayed by the oscilloscope module and wherein the oscilloscope module displays the signal component having the time delay specified by the computer control and analysis system.

7. The monitor of claim 6, wherein the analysis module includes an optical spectrum analyzer for selecting one or more components of the multiplexed signal upon a command received from the computer analysis and control system and returning information relating to specified parameters of the selected signal components to the computer analysis and control system.

8. The monitor of claim 7, wherein the delay module comprises a plurality of delay elements, each of the delay elements receiving one of the port signals, each delay element comprising a length of optical fiber, the length of the optical fiber being chosen so that an optical signal requires a specified time to pass through it, each of the delay elements comprising an optical fiber having a different length from the length of the optical fibers comprising the other delay elements of the delay module.

9. The monitor of claim 8, further including a reference signal generator for producing a reference signal to be used as a basis for comparison in order to identify the delays exhibited by the components of the multiplexed signal.

10. The monitor of claim 9, wherein the reference signal is a carrier signal and wherein the ports comprise a port array, the port array being operative to modulate the optical inputs onto the carrier signal to produce a plurality of modulated port signals, one of the modulated port signals representing each of the optical inputs and wherein the time delayed signals are produced by imposing a time delay on each of the modulated port signals.

11. The monitor of claim 10, further comprising a plurality of switches, each of the switches being operative to connect or isolate one of time delayed signals from the multiplexer.

12. A method of optical signal analysis, comprising the steps of:
 receiving each of a plurality of optical signals transmitted over an optical transmission line comprising a plurality of optical fibers at an optical port;
 generating a port signal based on each of the optical signals;
 subjecting the port signals to different time delays to produce time delayed signals corresponding to the optical signals;

multiplexing each of the time delayed signals to produce a multiplexed signal, the multiplexed signal having a plurality of multiplexed signal components, each of the components representing one of the time delayed signals and having a characteristic time delay; and selecting one or more of the multiplexed signal components by specifying a time delay corresponding to one of the time delayed signals and selecting the multiplexed signal exhibiting the specified delay, selecting of signals including distinguishing between signal components corresponding to optical signals originating from different sources.

13. The method of claim 12, wherein the step of generating the port signals includes modulating each of the optical signals onto a reference signal.

14. The method of claim 13, wherein the step of selecting the one or more of the multiplexed signal components is followed by a step of analyzing the selected components.

15. The method of claim 14, wherein the step of analyzing the selected components is accompanied by a step of displaying images of the selected components.

16. The method of claim 15, wherein the reference signal is an output of a phase locked loop system.

* * * * *